(12) United States Patent
Ayres, Jr. et al.

(10) Patent No.: US 8,218,886 B2
(45) Date of Patent: *Jul. 10, 2012

(54) TRANSITIONING COMPRESSION LEVELS IN A STREAMING IMAGE SYSTEM

(75) Inventors: Kenneth James Ayres, Jr., Rockville, MD (US); Szymon Swistun, Atlanta, GA (US); Van Dung Dang To, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/573,086

(22) Filed: Oct. 2, 2009

(65) Prior Publication Data

US 2010/0020868 A1  Jan. 28, 2010

Related U.S. Application Data (63) Continuation of application No. 11/184,345, filed on Jul. 19, 2005, now Pat. No. 7,616,821.

(51) Int. Cl.
  *G06K 9/36* (2006.01)
  *G06K 9/00* (2006.01)
  *G06F 15/16* (2006.01)
(52) U.S. Cl. ......... 382/239; 382/251; 709/203; 709/247
(58) Field of Classification Search .................. 382/239, 382/251; 709/203, 247
  See application file for complete search history.

(56) References Cited

U.S. PATENT DOCUMENTS

| | | | |
|---|---|---|---|
| 5,396,284 A | 3/1995 | Freeman | |
| 5,623,424 A | 4/1997 | Azadegan et al. | |
| 5,708,767 A | 1/1998 | Yeo et al. | |
| 5,930,398 A | 7/1999 | Watney | |
| 6,243,497 B1 | 6/2001 | Chiang et al. | |

(Continued)

FOREIGN PATENT DOCUMENTS

CN  1357198  7/2002

(Continued)

OTHER PUBLICATIONS

Boll, Susanne et al., "MPEG-L/MRP: Implementing Adaptive Streaming of MPEG Videos for Interactive Internet Applications," http://woodworm.cs.uml.edu/~rprice/ep/boll-demo/, Apr. 12, 2005, pp. 1-6.

(Continued)

*Primary Examiner* — Anand Bhatnagar
*Assistant Examiner* — Soo Park
(74) *Attorney, Agent, or Firm* — Francis Lammes; Stephen J. Walder, Jr.; Matthew B. Talpis (57) ABSTRACT

Systems and media for transitioning compression levels of a streaming image system include a machine-accessible medium of a storage device containing instructions for transitioning compression levels between image frames in a streaming image system. Embodiments may include receiving client information from a client of an interactive streaming image system, generating a new image frame based on the received information, determining an initial compression level, comparing the new image frame to a previous frame to determine whether content changed, performing a smoothing heuristic by generating a multi-frame smoothing routine by increasing image quality in response to no change of content and decreasing image quality in response to a change in content, setting the new compression level based on the multi-frame smoothing routine, and encoding and transmitting the new image frame and compression level to a client.

12 Claims, 5 Drawing Sheets

U.S. PATENT DOCUMENTS

| | | | |
|---|---|---|---|
| 6,449,392 | B1 | 9/2002 | Divakaran et al. |
| 6,614,941 | B1 | 9/2003 | Stone et al. |
| 6,772,191 | B1 | 8/2004 | Kurosawa et al. |
| 6,995,805 | B1 | 2/2006 | Park |
| 7,130,472 | B2 | 10/2006 | Lizuka et al. |
| 7,506,071 | B2* | 3/2009 | Ayres et al. ............... 709/247 |
| 7,616,821 | B2 | 11/2009 | Ayres, Jr. et al. |
| 7,668,965 | B2* | 2/2010 | Ayres et al. ............... 709/231 |
| 2003/0161398 | A1* | 8/2003 | Feder et al. ............. 375/240.03 |
| 2004/0089814 | A1* | 5/2004 | Cheatle ..................... 250/397 |
| 2004/0170392 | A1 | 9/2004 | Lu et al. |
| 2007/0019866 | A1 | 1/2007 | Ayres, Jr. et al. |
| 2007/0022217 | A1 | 1/2007 | Ayres, Jr. et al. |
| 2007/0028286 | A1 | 2/2007 | Greene et al. |
| 2008/0175504 | A1 | 7/2008 | Greene et al. |
| 2008/0178244 | A1 | 7/2008 | Ayres et al. |

FOREIGN PATENT DOCUMENTS

| | | |
|---|---|---|
| EP | 0 513 520 B1 | 11/1992 |
| EP | 0705040 B1 | 4/1996 |
| EP | 0 938 237 A2 | 8/1999 |
| JP | 7084839 A | 3/1995 |
| JP | 7236139 A | 9/1995 |
| JP | 9294267 A | 11/1997 |
| JP | 11239329 A | 8/1999 |
| WO | WO 93/19467 | 9/1993 |
| WO | WO 00/79797 A1 | 12/2000 |
| WO | WO 03/028237 A1 | 4/2003 |
| WO | WO 2005/050988 A1 | 6/2005 |
| WO | WO 2006/067373 A1 | 6/2006 |

OTHER PUBLICATIONS

Ding, Wei, "Joint Encoder and Channel Rate Control of VBR Video over ATM Networks," IEEE Transactions on Circuits and Systems for Video Technology, vol. 7, No. 2, Apr. 1997, pp. 266-278.

Jun Yu et al., "An Efficient Method for Scene Cut Detection," Pattern Recognition Letters, North-Holland Publ. Amsterdam, NL., vol. 22, No. 13, Nov. 2001, pp. 1379-1391.

PCT Notification of Receipt of Record Copy, From the International Bureau, mailed Oct. 5, 2006; Applicant: International Business Machine Corporation, International Application No. PCT/EP2006/064229, p. 1.

PCT Notification Concerning Submission or Transmittal of Priority Document, From the International Bureau, mailed Nov. 23, 2006; Applicant: International Business Machines Corporation, International Application No. PCT/EP2006/064229, p. 1.

PCT First Notification Informing the Applicant of the Communication of the International Application (To Designated Offices which do not Apply the 30 Month Time Limit under Article 22(1)), From the International Bureau, mailed Feb. 22, 2007; Applicant: International Business Machines Corporation, International Application No. PCT/EP2006/064229, p. 1.

ISR including PCT transmittal & Written Opinion, From the International Searching Authority, mailed May 11, 2007, Applicant: International Business Machines Corporation, International Application No. PCT/EP2006/064229, pp. 11.

ISR including PCT transmittal, From the International Searching Authority, Applicant: International Business Machines Corporation, International Application No. PCT/EP2006/064522, Nov. 9, 2006, 5 pages.

U.S. Appl. No. 11/184,344.
U.S. Appl. No. 11/184,345.
U.S. Appl. No. 11/191,576.
U.S. Appl. No. 12/057,122.
U.S. Appl. No. 12/057,320.

He, et al., "Variable Frame-Rate Video Coding Based on Global Motion Analysis", PCM 2001, LNCS 2195, pp. 426-433.

* cited by examiner

TRANSITIONING COMPRESSION LEVELS IN A STREAMING IMAGE SYSTEM

CROSS-REFERENCES TO RELATED APPLICATION(S)

Pursuant to 35 USC §120, this continuation application claims priority to and benefit of U.S. patent application Ser. No. 11/184,345, entitled "METHODS FOR TRANSITIONING COMPRESSION LEVELS IN A STREAMING IMAGE SYSTEM", attorney docket number AUS920050190US1(4121), filed on Jul. 19, 2005, the disclosure of which is incorporated herein in its entirety for all purposes.

BACKGROUND OF THE INVENTION

The present invention is in the field of streaming image systems. More particularly, the present invention relates to systems, methods and media for transitioning compression levels in a streaming image system.

The ability to stream images or other content from a server to multiple clients is a quickly-growing need. Multi-media applications that utilize streaming images continue to increase in popularity and include video games, navigation software, streaming movies or video, and the like. These applications, however, often are network-resource intensive and result in bandwidth bottlenecks and network slowdowns when content providers use them to distribute content, particularly to large numbers of users. As the popularity of streaming image applications continues to increase, the network performance problems associated with them will be exacerbated.

To reduce the impact of streaming image content on a network, content providers often compress their images before transmission. The client system must then decompress the image upon receipt before displaying the image to a user. Depending on the level of compression, network traffic can be significantly decreased by utilizing compression. One compression scheme for video images is motion-JPEG which extends the Joint Photographic Experts Group (JPEG) digital image compression standard to videos by encrypting each frame in the JPEG format. The JPEG group created the ISO/IEC International Standard 10918-1 ITU-T Recommendation T-81 (hereinafter 'JPEG') to create a decoding/encoding standard. JPEG and Motion-JPEG are lossy compression standards and thus information is lost during the compression process. Motion-JPEG provides good per-frame compression levels but some of its compression steps, such as Huffman coding, are not always necessary and can slow performance.

The Moving Pictures Experts Group (MPEG) created another family of compression standards that include MPEG-1, MPEG-2, and MPEG-4 (ISO/IEC International Standards 11172, 13818, and 14496, respectively). The MPEG working group designed the MPEG standards to work for multi-media streaming and utilize block-based motion compensated prediction (MCP) to assist in compression. For many applications, MPEG improves upon the performance of motion-JPEG. For interactive streaming image applications, however, MPEG is not optimal. MPEG requires a server to generate multi-frame movies to achieve good compression levels, making it less useful for interactive applications that have frame-by-frame interactions. Instead, MPEG is designed and optimized for streaming predictable content, such as movies or other videos, to client or other user devices.

Interactive streaming image systems provide significant challenges to content providers desiring to distribute content from a server to multiple clients. Interactive streaming image systems typically receive user input for each frame so that each image frame is customized based on the latest user information. A map-based application, for example, might provide an image frame based on user position and heading so that the application could create an image showing the user what they would see at that position and heading. In another example, an application that displays a virtual view of what is behind an automobile may base its image on the current position, direction, and speed of the automobile. Because each frame must be recalculated based on new information, MPEG does not provide an efficient method as it does not achieve its best compression rates when working with single frames. Similarly, motion-JPEG does not provide any advantage when used with interactive streaming image systems as it applies a compression method that may be too resource-intensive for each image frame.

There is, therefore, a need for an effective mechanism for managing an interactive streaming image system. There is an even greater need for such a mechanism when a content provider desires to provide interactive image content to multiple client systems.

BRIEF SUMMARY OF THE INVENTION

Systems and media for transitioning compression levels of a streaming image system include a machine-accessible medium of a storage device containing instructions for transitioning compression levels between image frames in a streaming image system. Embodiments of the medium include receiving client information from a client of an interactive streaming image system, generating a new image frame based on the received information, determining an initial compression level, comparing the new image frame to a previous frame to determine whether content changed, performing a smoothing heuristic by generating a multi-frame smoothing routine by increasing image quality in response to no change of content and decreasing image quality in response to a change in content, setting the new compression level based on the multi-frame smoothing routine, and encoding and transmitting the new image frame and compression level to a client.

Another embodiment provides an interactive streaming image system. The system may generally include a communications module to receive client information from one or more clients of the interactive streaming image system and to transmit encoded new image frames and compression levels to clients. The system may also include a content generator to generate a new image frame based on the received client information and a content change detector to compare the new image frame to a previous image frame to determine whether content changed between the new image frame and the previous image frame. The system may also include a smoothing module in communication with the content generator to determine an initial compression level, to perform a smoothing heuristic by generating a multi-frame smoothing routine based on the initial compression level, a target compression level, and a number of frames to achieve the target compression level, wherein performing the smoothing heuristic comprises increasing image quality in response to no change of content between the new image frame and the previous image frame, and wherein further performing the smoothing heuristic comprises decreasing image quality in response to a change in content between the new image frame and the previous image frame. The smoothing module may also set the new compression level for the image frame based on the generated multi-frame smoothing routine. The system may also include a content encoder in communication with the smoothing module to encode the new image frame based on the new compression level.

BRIEF DESCRIPTION OF THE SEVERAL VIEWS OF THE DRAWINGS

Other aspects of the invention will become apparent upon reading the following detailed description and upon reference to the accompanying drawings in which, like references may indicate similar elements.

DETAILED DESCRIPTION OF THE INVENTION

The following is a detailed description of example embodiments of the invention depicted in the accompanying drawings. The example embodiments are in such detail as to clearly communicate the invention. However, the amount of detail offered is not intended to limit the anticipated variations of embodiments; but, on the contrary, the intention is to cover all modifications, equivalents, and alternatives falling within the spirit and scope of the present invention as defined by the appended claims. The detailed descriptions below are designed to make such embodiments obvious to a person of ordinary skill in the art.

Systems and media for transitioning compression levels of a streaming image system include a machine-accessible medium of a storage device containing instructions for transitioning compression levels between image frames in a streaming image system. Embodiments may include receiving client information from a client of an interactive streaming image system, generating a new image frame based on the received information, determining an initial compression level, comparing the new image frame to a previous frame to determine whether content changed, performing a smoothing heuristic by generating a multi-frame smoothing routine by increasing image quality in response to no change of content and decreasing image quality in response to a change in content, setting the new compression level based on the multi-frame smoothing routine, and encoding and transmitting the new image frame and compression level to a client.

The disclosed embodiments provide a methodology and system for transitioning compression levels in a streaming image system. In the disclosed embodiments, a server that is generating an image stream may request a smoothing module to determine a compression level for each image frame of the image stream. The smoothing module may perform a smoothing heuristic by generating a multi-frame smoothing routine for one or more image frames of the image stream. The smoothing module may use information such as an initial compression level from which to start, a target compression level, and a number of frames in which to achieve the target compression level. Based on the generated multi-frame smoothing routine, the smoothing module may then set a compression level for each image frame. The server may then use the compression level to encode the image frame before transmitting it to a client. The client may then decode the image frame using the compression level and display the image to a user.

Using the disclosed compression level transition system, the server may advantageously transition a user between high and low compression levels with little or no impact on the user's viewing experience. This may allow a server to conserve bandwidth by smoothly increasing the compression level when only a lower quality image is needed and likewise smoothly decreasing the compression level when a higher quality image is needed. An interactive image streaming system may advantageously use the disclosed system to smoothly provide varying levels of compression depending on the user's activity and interaction with their environment. The disclosed compression level transition system may also be useful for streaming image system that are not interactive but for which a varying compression level may provide useful in reducing bandwidth or other resource requirements.

While specific embodiments will be described below with reference to particular configurations of hardware and/or software, those of skill in the art will realize that embodiments of the present invention may advantageously be implemented with other substantially equivalent hardware and/or software systems.

Figure 1:
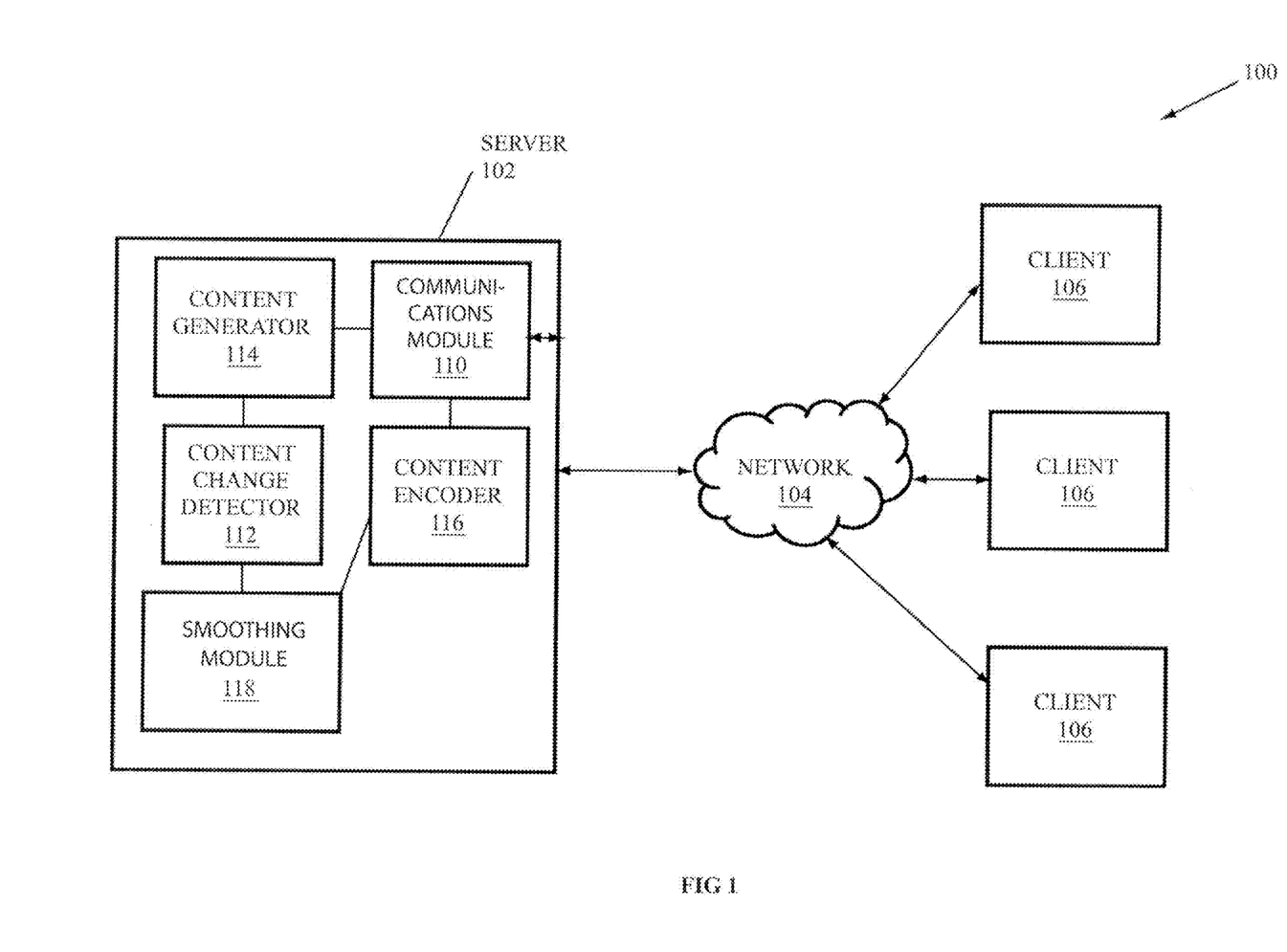
FIG. 1 depicts an environment for a system for streaming images from a server to a plurality of clients according to one embodiment.

Turning now to the drawings, FIG. 1 depicts an environment for a system for streaming images from a server to a plurality of clients according to one embodiment. In the depicted embodiment, the interactive image streaming system 100 includes a server 102 and one or more clients 106 connected via a network 104. The clients 106 may transmit client information to the server 102 via network 104 and the server 102 may then generate a new image frame based on the client information. After the server 102 generates the new image frame, it may then encode the image frame at a defined compression level and transmit the encoded image frame and an indication of the compression level used to encode the image frame to the client 106. The client 106 may then decode the image frame based on the compression level and display the image to a user. Using the interactive image streaming system 100, the client 106 and server 102 may thus work together to generate each image frame of a streaming image stream based on client information from each cycle. The interactive image streaming system 100 may advantageously choose an appropriate level of compression (as will be described in more detail subsequently) based on the client information, the difference between successive images, and other information, which may result in more efficient use of bandwidth and processing in an interactive image streaming system 100.

The server 102, the one or more clients 106, and any or all of their components may execute on a general or special purpose computer system such as one or more of a personal computer, workstation, server, mainframe computer, notebook or laptop computer, tablet PC, desktop computer, portable computer system, PDA, set-top box, mobile phone, wireless device, or the like. The computer system may, in one embodiment, include a central processing unit (CPU) and associated volatile and non-volatile memory, including random access memory (RAM) and basic input/output system read only memory (BIOS ROM), a system monitor, a keyboard, one or more flexible diskette drives, a CD-ROM drive, a fixed disk storage drive (also known as a "hard drive" or "hard disk drive"), a pointing device such as a mouse, and an optional network interface adapter, all electrically connected using a motherboard or system planar to electrically connect these components together. The server 102 in one embodiment may be an International Business Machine Corporation (IBM®) eServer or similar server having one or more processors, or threads of processors, executing software and/or one or more state machines coupled with data storage devices such as RAM, read only memory (ROM), flash memory, compact disk drives, hard drives, and the like. The client 106 in one embodiment may be a wireless device having a processor coupled with data storage devices and user input and output devices, such as a keypad and display screen.

Network 104 may be any type or combination of data communications channels, such as the Internet, an intranet, a LAN, a WAN, an Ethernet network, wireless network, etc. The Internet or other public network may be particularly useful as network 104 when a centrally located server 102 is transmitting streaming image content to a plurality of distributed clients 106 as communications between these will be facilitated. Some or all of the clients 106 may be communicating with the Internet network 104 (and the server 102) via a wireless network 104. Those skilled in the art will recognize, however, that the invention described herein may be implemented utilizing any type of data communications channel.

The server 102 may include components such as a communications module 110, a content change detector 112, a content generator 114, a content encoder 116, and a smoothing module 118. The communications module 110 may facilitate the server 102 in transmitting information to a client 106 via network 104 as well as receiving information from client 106 via network 104. The communications module 110 may use any type of protocol, such as client-server protocols, in its communications with clients 106. In one embodiment, the server 102 may receive client information from clients 106 using communications module 110 and may transmit encoded image frames and/or compression information to clients 106 using communications module 110. Client information may include information identifying the client 106 or its user (or the user's preferences) as well as information relating to the image that should be streamed to the client 106, such as the user's current location or orientation. In one example, for an image streaming application that displays to a user a 3-dimensional (3-D) image based on their current position, client information may include an indication of the user's position, such as coordinates. For another application that displays to a user a virtual rendering of what they should see, client information may also include directional information such as a compass direction that provides an indication of the direction the user is looking. Those skilled in the art will recognize that any type of information may be included as client information.

The content generator 114 may generate a new image frame based on the client information received by the communications module 110. The content generator 114, which may be a multi-media or streaming image application, may use any type of methodology to determine the contents of a new image frame. The content generator 114 may, for example, generate a new image frame based on the current location or direction of the client 106 or its user, based on the received or calculated speed of the user, based on the occurrence of an event, based on the current time, based on current weather or lighting conditions, based on the location of other clients 106 or users, or any other factors. In one exemplary embodiment, content generator 114 generates a new image frame to create a 3-D representation of the current location of the client 106. In another exemplary embodiment, content generator 114 may generate a new image frame that depicts a virtual view of what a user with client 106 would see based on their current location and direction. The content generator 114 in another embodiment may determine the velocity and direction of the client 106 based on repeated receipt of client information and may then use the determined velocity and direction to generate an appropriate new image frame.

The content change detector 112 may analyze the new image frame generated by the content generator 114 and compare it with the previous image frame to determine if they differ. The content change detector 112 may use any type or combination of methodologies to determine if the content between a new image frame and a previous frame changed. The methodology used by the content change detector 112 may be selected by an administrator or user, may be based on current network 104 conditions, or other factors. In one embodiment, the content change detector 112 may use a comparison of the compression sizes of each image frame to determine whether a change has occurred. A non-changing compressed image frame size in an interactive system likely indicates that the client 106 is requesting the same image repeatedly and the successive image frames are the same. In another embodiment, the content change detector 112 may utilize vector or statistic processing of bit maps of two image frames by using Boolean analysis to determine if there is a difference between vectors. In a further embodiment, the content change detector 112 may utilize an indexed version of the vector of statistic processing algorithm when the image has more regularity and speed is more critical. In an alternative embodiment, the content change detector 112 may use scene tracking or other algorithms to attempt to predict the level at which the user of the client 106 is interacting with her environment, using the prediction to help determine whether a new image frame is the same as a previous image frame. In another alternative embodiment, the content change detector 112 may use the client information to determine if a change in image has occurred, as if there is no change in the client's position, for example, the image may be unlikely also to change. In another alternative embodiment, the content change detector 112 may use one of the content change detection methods to determine the magnitude or degree of the change between image frames instead of whether a change has occurred. This may be useful when the magnitude or degree of change will have an impact on the chosen compression level.

The content encoder 116 and smoothing module 118 may serve to, in combination or singly, determine the appropriate level of compression for the image frame to be transmitted to and encode the image frame at the selected level of compression. In one embodiment, if there is no content change between successive image frames (as determined by the content change detector 112), the content encoder 116 may desire to improve the quality of the image frame to be transmitted (and thus lower the compression level). In an interactive image streaming system, a static image (not changing between successive frames) indicates that the image from the client's point of view is stationary and image quality is thus raised in importance. In contrast, if successive images differ from each other, the client 106 point of view has motion and a lower quality of image may be utilized (with higher compression levels). When a user is viewing an image depicting motion, details in the image may be less important as details become blurred and the eye accounts for the loss in detail. When a user is viewing an image that is still, image details may be more important as the user will be more likely to see any flaws or lack of details, compression artifacts, and the like.

The disclosed system advantageously adapts the compression level based on the motion depicted in the image stream (as represented by the difference, or lack thereof, between successive images) based on the perceived motion of the user and/or client 106. When successive images vary between each frame (implying motion), the content encoder 116 may increase the compression level and reduce the bandwidth requirements without detracting from the user's viewing experience. When successive images are the same (implying a stationary client 106), the content encoder 116 may decrease the compression level and increase the quality of the image. While such action may increase the bandwidth requirements, streaming image quality for the user may be preserved. In one embodiment, the content encoder 116 may not need to transmit successive identical images and instead may transmit only an indication to the use the previous image, saving bandwidth in the stationary user situation. In an alternative embodiment, the content encoder 116 and smoothing module 118 may base the selected compression level also on the magnitude or degree of change between frames so that slight changes to the frame do not cause large jumps in the level of compression.

Figure 3:
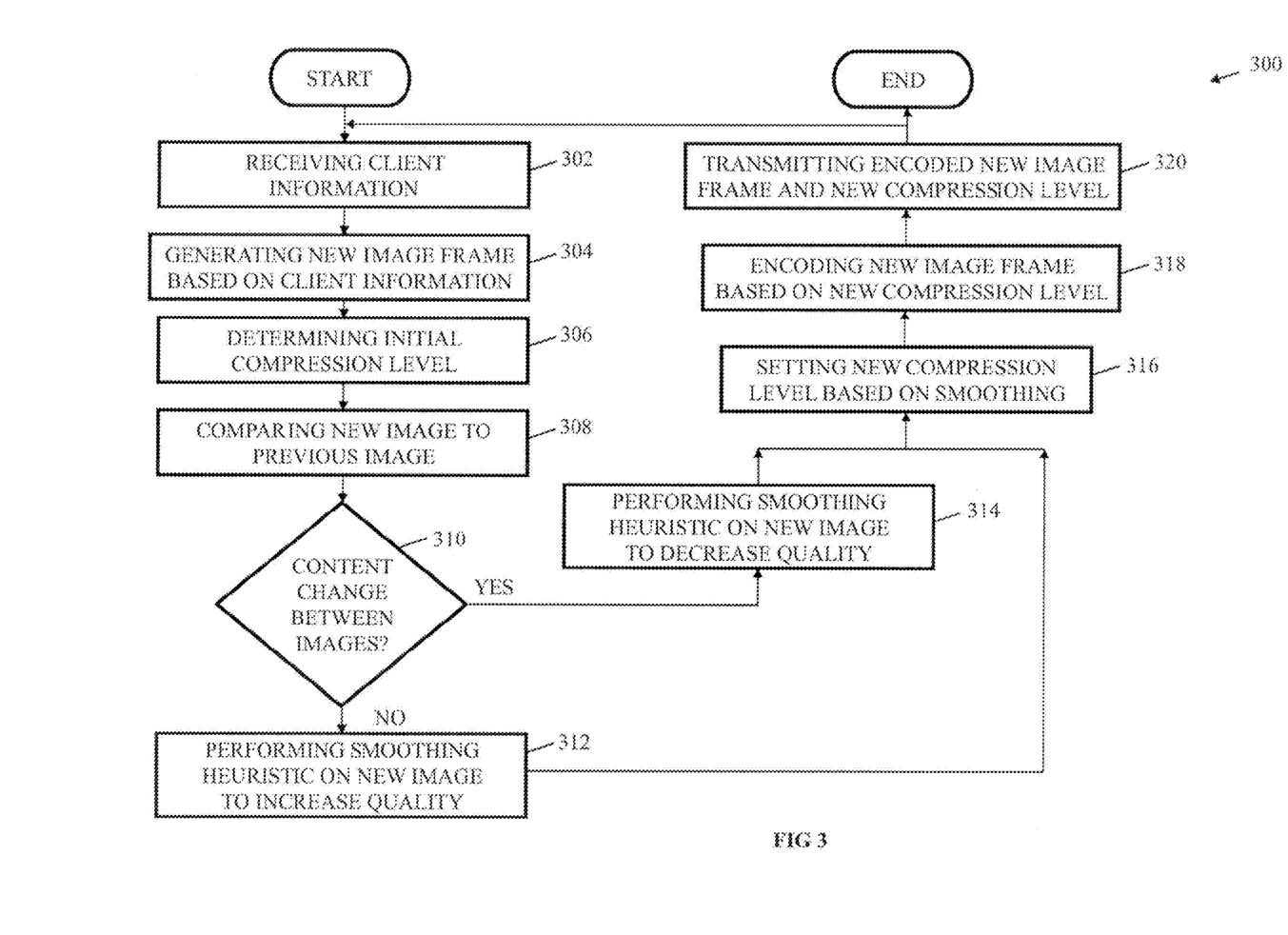
FIG. 3 depicts an example of a flow chart for generating, encoding, and transmitting a new image frame according to one embodiment.

As described in more detail in relation to FIG. 3, the content encoder 116 may use the smoothing algorithms of the smoothing module 118 to smooth the transition between different levels of compression to improve the user experience. The smoothing module 118 may use an initial compression level, a target compression level, and a number of frames the system is willing to wait to meet the target compression level as inputs. In an alternative embodiment, the smoothing module 118 may determine the number of frames the system is willing to wait to meet the target compression level based on any factors, such as the initial compression level and the target compression level. For example, the smoothing module 118 may choose a larger number of frames if the gap between the initial and target compression levels is large.

Using these inputs, the smoothing module 118 may determine a new level of compression for the image frame by running a smoothing heuristic to generate a multi-frame smoothing routine. In one embodiment, the smoothing module 118 may vary the compression level via the lossy quantization step of compression standards such as Motion-JPEG or MPEG, as described in more detail in relation to FIG. 5. The compression algorithm described in relation to FIG. 5 may utilize multiplier lookup tables for different levels of compression as required. Those skilled in the art will recognize that the smoothing module 118 may use any type of smoothing mechanism.

The disclosed smoothing module 118 may advantageously provide an effective and efficient mechanism for transitioning compression levels in an image streaming system such as the disclosed interactive image streaming system 100. The disclosed smoothing module 118 may also transition compression levels in any other type of image streaming system, such as one with fixed content such as movies or other video. In any image streaming system, a server 102 may use a smoothing module 118 to facilitate transitioning compression levels either upward or downward without having a sever impact on the user's viewing experience. The disclosed smoothing heuristic may allow both the server 102 to smooth the transitions between compression levels over a number of frames to make the transition less intrusive to a user's viewing quality. An interactive image streaming system 100 may utilize the smoothing module 118 to facilitate compression level changes used to reduce bandwidth requirements in response to user activity (i.e., user's movement in their client 106 application). By advantageously transitioning compression levels for image frames in a stream, the disclosed system may therefore facilitate systems with varying compression levels and resulting efficiencies. By smoothing the transitions between different compression levels using the smoothing heuristic, the visual quality of streaming images may thus be preserved while operating within network constraints.

Figure 2:
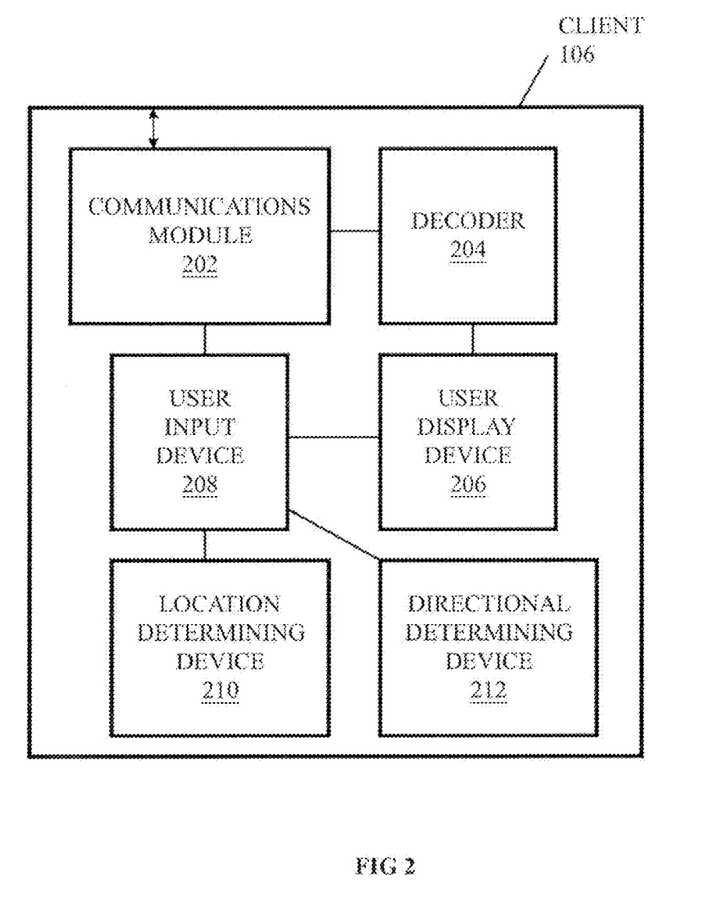
FIG. 2 depicts the structure of a client of the streaming image system of FIG. 1 according to one embodiment.

FIG. 2 depicts the structure of a client of the streaming image system of FIG. 1 according to one embodiment. In the depicted embodiment, client 106 includes a communications module 202, a decoder 204, a user display device 206, a user input device 208, a location determining device 210, and a directional determining device 212. Similarly to the communications module 110 of the server 102, the communications module 202 may facilitate the client 106 in transmitting information to server 102 via network 104 as well as in receiving information from server 102 via network 104. The communications module 202 may use any type of protocol in its communications with server 102. In one embodiment, the client 106 may transmit client information to server 102 using communications module 202 and may receive encoded image frames and/or an indication of a compression level from server 102 using communications module 202.

The decoder 204 may decode the encoded image received by the communications module 202, such as by decompressing the encoded image. The decoder 204 may use the indication of the compression level received by the communications module 202 to assist it in decoding the image. Additionally, the decoder 204 may access one or more multiplier lookup tables associated with the compression level so that the decoder 204 may properly decode the image. After the decoder 204 processes the image, the user display device 206 may display the decoded image to the user, such as by a display screen, printed images, holograms or any other output device.

As described previously, client information may include indications of a user and/or client 106's identity, preferences, location, orientation, or other information. The optional user input device 208, location determining device 210, and directional determining device 212 may help solicit or provide client information. The user input device 208, for example, may receive user input from any type of device, such as by keypad, keyboard, button, stylus, mouse, joystick, virtual reality device, voice command, or eye movement. User input may include user preferences such as a request for a higher or lower level of compression, a request for faster screen rates, and the like. User input may also include a user location or orientation. The location determining device 210 may determine a current location for the client 106 and/or user. The location determining device 210 may be any type of location-determining device such as a Global Positioning System (GPS) receiver or an inertial measurement unit (IMU). The directional determining device 212 may determine a current orientation for the client 106 and/or user. The directional determining device 212 may be any type of directional-determining device such as an electronic compass, GPS receiver using triangulation, traditional compass, or IMU. The client information generated by the user input device 208, location determining device 210, and/or directional determining device 212 may allow the server 102 to customize each generated image frame based on the current status of the client 106 and/or user.

FIG. 3 depicts an example of a flow chart for generating, encoding, and transmitting a new image frame according to one embodiment. The server 102 or any of its components, alone or in combination, may perform the method of flow chart 300. Flow chart 300 begins with element 302, receiving client information. In one embodiment, the communications module 110 may receive client information from a client 106 via network 104. After receiving the client information, the content generator 112 may generate a new image frame based on the received client information at element 304. The content generator 112 may generate the new image frame using any type of algorithm depending on the application. For example, the content generator 112 may generate an image frame representing a view from the user's point of view if the application so required.

The smoothing module 118 may next determine an initial compression level for the generated image frame at element 306. In one embodiment, the smoothing module 118 may simply select the most recently-used compression level as the initial compression level. In another embodiment, the smoothing module 118 may base the initial compression level on whether the system is within a multi-frame smoothing routine. While within a multi-frame smoothing routine, the initial compression level may be based on the compression level appropriate for the current frame of the multi-frame smoothing routine. In one example, of the smoothing module 118 started a compression routine that started at a compression level of five (5) and ended at ten (10) over six (6) frames, incrementing one compression level per frame, the initial compression level for the third frame may be compression level seven (7) (5+2=7). In one embodiment, the smoothing module 118 may utilize a multi-frame smoothing routine that extends for one to two seconds in order to reduce the impact on the user. In one example, if the image stream was being transmitted at 15 frames per second a multi-frame smoothing routine of 15 to 30 frames to transition from one compression level to another may prove useful. Those skilled in the art will recognize that the smoothing module 118 may utilize other multi-frame smoothing routines.

The content change detector 112 may compare the generated new image to the previous image at element 308 after the smoothing module 118 determines the initial compression level. The content change detector 112 may use any methodology to compare the two images, as described previously. If the content change detector 112 determines at decision block 310 that the content has changed between the generated new image and the previous image frame, the method of flow chart 300 continues to element 314. At element 314, the smoothing module 118 may perform a smoothing heuristic on the new image to decrease its quality and increase the level of compression. The smoothing module 118 increases the level of compression as the content change between images indicates that the user's perspective is likely moving and that the user is thus likely to tolerate lower image quality. If the content change detector 112 determines at decision block 310 that the content has not changed between the generated new image and the previous image frame, the method of flow chart 300 continues to element 312. At element 312, the smoothing module 118 may perform a smoothing heuristic on the new image to increase its quality and decrease the level of compression. The smoothing module 118 may decrease the level of compression as the lack of content change between images indicates that the user's perspective is likely static and that the user is thus likely to require higher image quality.

The smoothing module 118 may perform its smoothing heuristic at elements 312 or 314 using any methodology. In one embodiment, the smoothing module 118 may increment between the initial compression level and the target compression level (in the appropriate direction depending on whether it is increasing or decreasing) through a series of compression quality steps resulting in a multi-stage compression routine over multiple image frames. For example, the smoothing module 118 may use five levels of compression between the minimum and maximum levels of compression. For each level of compression, however, the server 102 and client 106 may each need to contain a multiplier lookup table for that level of compression, as will be described in more detail in relation to FIG. 5. The number of compression levels requires a trade-off between memory usage at both the server 102 and client 106 and the smoothness of the heuristic and the resulting streaming images. A higher number of compression levels may result in a smoother transition between compression levels but may require additional amounts of memory, which may be problematic particularly for a client 106 that may have limited processing and memory resources. Three or more levels of compression are typically desirable for smooth transitions but one skilled in the art will recognize that lower levels are possible with potentially degraded performance. The smoothing module 118 may, in generating a multi-frame smoothing routine, use a roughly linear transition from one compression level to another or may alternatively use any other type of algorithm, such as one biased towards higher or lower compression levels.

After the smoothing module 118 has performed its smoothing heuristic, the content encoder 116 may set the new compression level for the image frame at element 316 based on the results from the smoothing module 118. With the new compression level the content encoder 116 may then encode the new image frame based on the new compression level at element 318. As described previously, the content encoder 116 may use any type of encoding algorithm to encode the new image frame. The communications module 110 may then transmit the encoded new image frame and an indication of the new compression level to the client 106 at element 320, after which the method of flow chart 300 terminates. The method of flow chart 300 may also return to element 302 to repeat the process for each frame.

Figure 4:
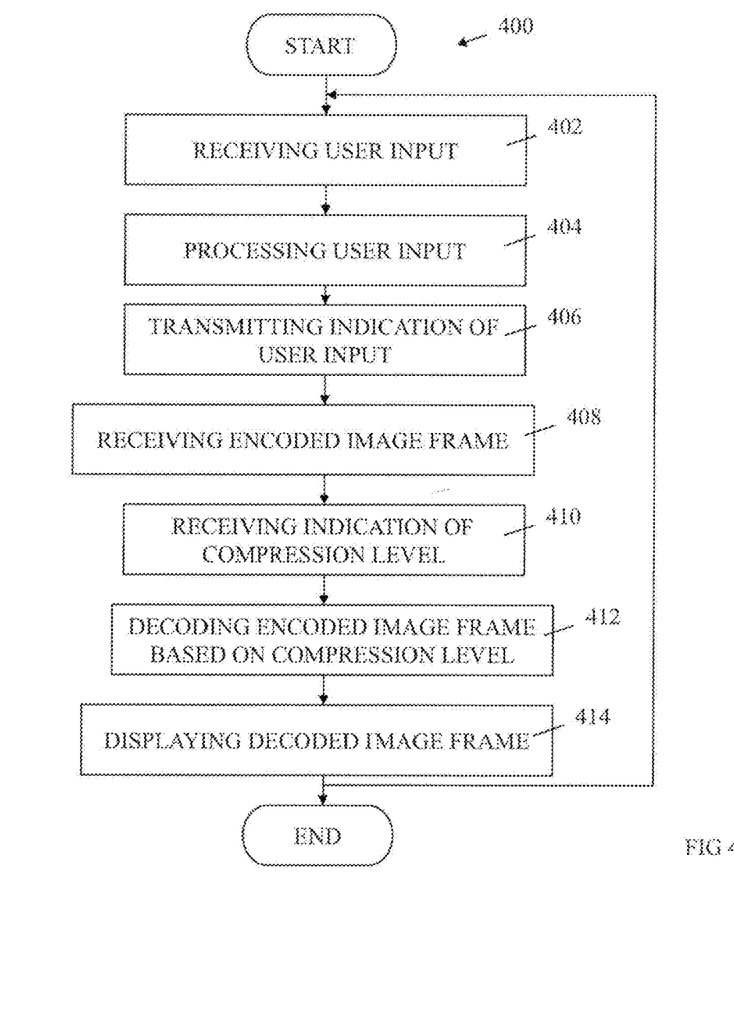
FIG. 4 depicts an example of a flow chart for receiving user input and receiving and displaying an image frame to a user according to one embodiment.

FIG. 4 depicts an example of a flow chart for receiving user input and receiving and displaying an image frame to a user according to one embodiment. The client 106 or any of its components, alone or in combination, may perform the method of flow chart 400. Flow chart 400 begins with element 402, receiving user input. In one embodiment, the communications module 202 may receive input from a user via user input device 208, as described previously. Alternatively, the communications module 202 may receive input from the location determining device 210 or the directional determining device 212. The user input device may optionally process the user input at element 404, such as by converting the input to another form for transmission. At element 406, the communications module 202 may next transmit an indication of the user input to the server 102 via network 104.

After transmitting an indication of the user input, the method of flow chart 400 may continue to element 408, where the communications module 202 may receive an encoded image frame from the server 102 via network 104. At element 410, the communications module 202 may also receive an indication of the compression level for the encoded image frame from the server 102 via network 104. In one embodiment, the communications module 202 may receive the encoded image frame and the indication of the compression level in the same transmission.

Using the indication of the compression level, the decoder 204 may decode the encoded image frame at element 412. The decoder 204 may use the multiplier lookup tables related to the indicated compression level to perform the dequantization step of the decoding process, as described in more detail in relation to FIG. 5. After the image frame is decoded, the user display device 206 may display the decoded image frame to the user at element 414, after which the method of flow chart 400 terminates. The method of flow chart 400 may also return to element 402 to repeat the entire flow chart for each frame.

The disclosed method of flow chart 400 allows an interactive image stream to be displayed on a client 106 device. The communications module 202 may transmit an indication of the user's interaction to a server 102 and receive back an encoded image frame based on the user's interaction. The decoder 204 may then decode the image frame and the user display device 206 displays the decoded image frame to the user. The methods of FIGS. 3 and 4 may be repeated for each frame to give the user an interactive image streaming experience. The smoothing heuristic described herein advantageously facilitates varying the compression level based on the user's actions while reducing the degradation in the user's viewing experience, allowing for an effective and efficient use of the available bandwidth.

Figure 5:
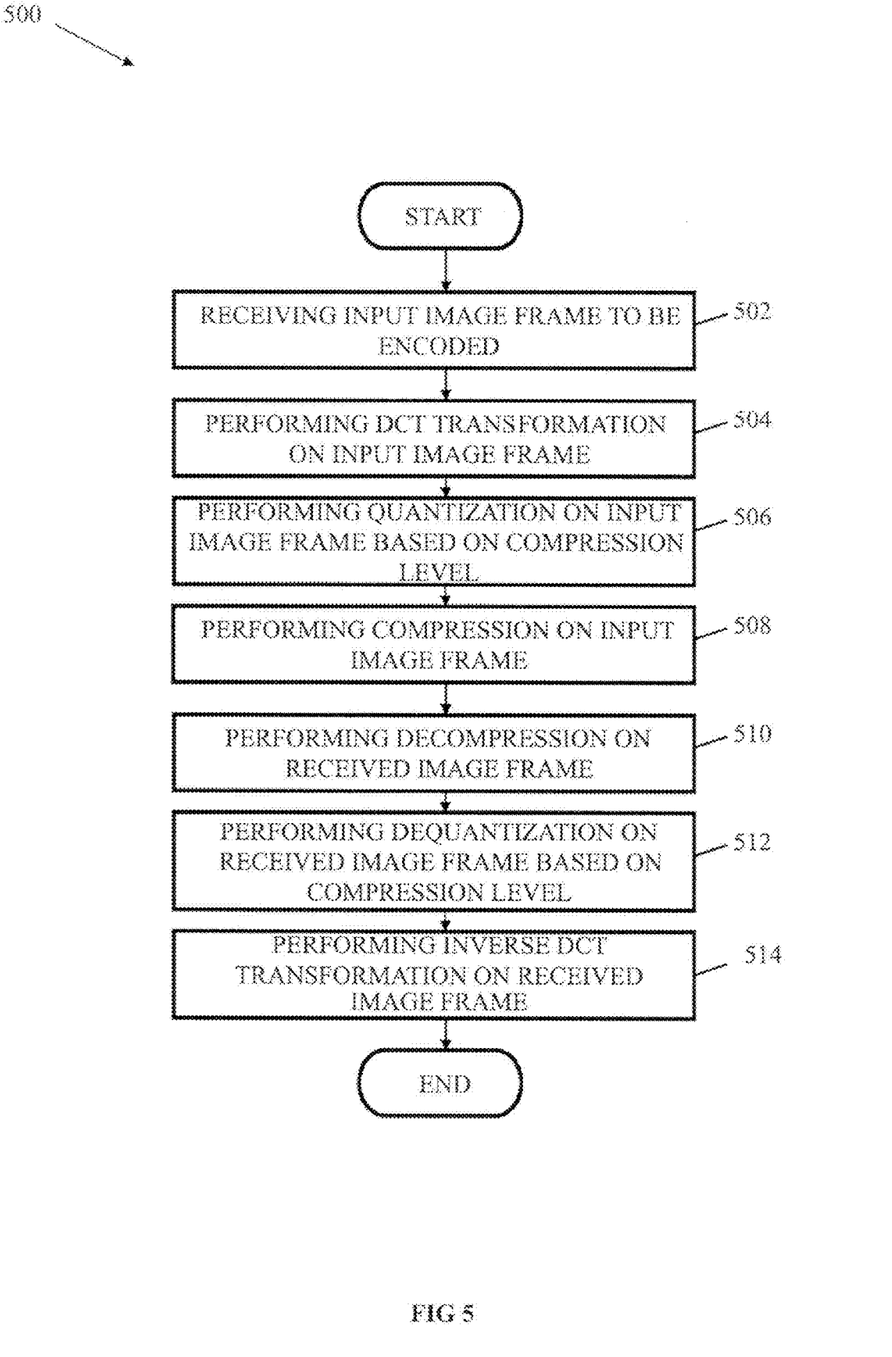
FIG. 5 depicts an example of a flow chart for encoding and decoding an image frame according to one embodiment.

FIG. 5 depicts an example of a flow chart for encoding and decoding an image frame according to one embodiment. The content encoder 116 of the server 102 and the decoder 206 of the client 106, alone or in combination, may perform the method of flow chart 500. The method of flow chart 500 may represent a description of a typical video encoding and decoding scheme or algorithm, such as MPEG or Motion-JPEG. The method of flow chart 500 is not meant to be exhaustive and particular encoding schemes may have more steps, such as the motion compensating steps of the MPEG algorithm, or entirely different methodologies. Those skilled in the art will recognize that the method of FIG. 5 is only one example and other encoding/decoding methodologies may also be used with the disclosed embodiments.

Flow chart 500 begins with element 502, where the content encoder 116 may receive an input image frame to be encoded. The content encoder 116 may next perform a discrete cosine transform (DCT) operation on the input image frame. The DCT operation may be a substantially lossless mathematical transformation that takes a signal (the spatial information of the input image frame) and transforms it into numeric data suitable to be compressed in the form of one or more 8×8 pixel blocks as output. Within the content encoder 116, the output of the DCT operation is quantized based on the selected compression level at element 506. The content encoder 116 may perform the quantization step by using constants from the appropriate lookup table as divisors on each 8×8 pixel block output from the DCT operation. The appropriate lookup table may be a lookup table associated with the selected compression level. There may be lookup tables for each possible compression level in one embodiment. The method of flow chart 500 may then continue to element 508, where the content encoder 116 may compress the quantized DCT values output from element 506. At element 508, the content encoder 116 may rearrange the quantized DCT values in a one-dimension array in a zig-zag sequence and may then use an entropy encoding mechanism that uses run length encoding (RLE) and/or Huffman encoding.

The decoder 206 of the client 106 may decode the encoded image frame by mathematically reversing and decompressing the encoded image frame. The decoder 206 may begin at element 510 by decompressing the receive image frame and, at element 512, the decoder 206 may perform dequantization (also known as inverse quantization) on the received image based on the selected compression level. The decoder 206 may perform the dequantization step by using constants from the appropriate lookup table as multiplication factors on each 8×8 pixel block after the decompression step. The appropriate lookup table may be the lookup table associated with the selection compression level. The same lookup tables may be advantageously stored in both the server 102 and client 106, respectively. The decoder 206 may then perform an inverse DCT transformation on the received image frame which results in an outputted image frame that may then be displayed or otherwise processed. The method of flow chart 500 may then terminate.

In general, the routines executed to implement the embodiments of the invention, may be part of an operating system or a specific application, component, program, module, object, or sequence of instructions. The computer program of the present invention typically is comprised of a multitude of instructions that will be translated by the native computer into a machine-readable format and hence executable instructions. Also, programs are comprised of variables and data structures that either reside locally to the program or are found in memory or on storage devices. In addition, various programs described hereinafter may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

It will be apparent to those skilled in the art having the benefit of this disclosure that the present invention contemplates methods, systems, and media for transitioning compression levels in a streaming image system. It is understood that the form of the invention shown and described in the detailed description and the drawings are to be taken merely as examples. It is intended that the following claims be interpreted broadly to embrace all the variations of the example embodiments disclosed.

What is claimed is:

1. A tangible computer storage medium of a storage device containing instructions effective, when executing in a data processing system, to cause said data processing system to perform operations comprising:

receiving, by a server of an interactive streaming image system, client information from one or more clients of the interactive streaming image system and which corresponds to a perceived movement of a user of one of the clients;

generating, by a content generator of the server, a new image frame based on the received client information which corresponds to the movement of the user;

determining, by the server, an initial compression level;

comparing, by a content change detector of the server, the new image frame to a previous image frame to determine whether content changed between the new image frame and the previous image frame which corresponds to the movement of the user;

performing, by a smoothing module of the server, a smoothing heuristic by generating a multi-frame smoothing routine based on the initial compression level, a target compression level, and a number of frames to achieve the target compression level;

wherein performing the smoothing heuristic comprises increasing image quality in response to no change of content between the new image frame and the previous image frame, and wherein further performing the smoothing heuristic comprises decreasing image quality in response to a change in content between the new image frame and the previous image frame which corresponds to the movement of the user;

setting by the smoothing module the new compression level for the image frame based on the generated multi-frame smoothing routine;

encoding, by a content encoder of the server, the new image frame based on the new compression level; and transmitting, by the server, the encoded new image frame and the new compression level to the one or more clients of the interactive streaming image system.

2. The tangible computer storage medium of claim 1, further comprising receiving by the smoothing module the target compression level, and the number of frames to achieve the target compression level.

3. The tangible computer storage medium of claim 1, wherein the target compression level is a higher level of compression than the initial compression level.

4. The tangible computer storage medium of claim 1, wherein the target compression level is a lower level of compression than the initial compression level.

5. The tangible computer storage medium of claim 1, wherein the number of frames to achieve the target compression level is greater than or equal to fifteen.

6. The tangible computer storage medium of claim 1, wherein the new compression level is associated with a multiplier lookup table.

7. The tangible computer storage medium of claim 1, wherein performing by the smoothing module a smoothing heuristic by generating a multi-frame smoothing routine comprises generating the multi-frame smoothing routine for a plurality of frames of an interactive streaming image stream.

8. An interactive streaming image system executing on a server having one or more processors, the system comprising:
   a communications module to receive client information from one or more clients of the interactive streaming image system and which corresponds to a perceived movement of a user of one of the clients;
   a content generator to generate a new image frame based on the received client information which corresponds to the movement of the user,
   a content change detector to compare the new image frame to a previous image frame to determine whether content changed between the new image frame and the previous image frame which corresponds to the movement of the user;
   a smoothing module in communication with the content generator to determine an initial compression level, to perform a smoothing heuristic by generating a multi-frame smoothing routine based on the initial compression level, a target compression level, and a number of frames to achieve the target compression level, wherein performing the smoothing heuristic comprises increasing image quality in response to no change of content between the new image frame and the previous image frame, and wherein further performing the smoothing heuristic comprises decreasing image quality in response to a change in content between the new image frame and the previous image frame which corresponds to the movement of the user;
   wherein the smoothing module sets the new compression level for the image frame based on the generated multi-frame smoothing routine;
   a content encoder in communication with the smoothing module to encode the new image frame based on the new compression level; and
   wherein the communications module transmits the encoded new image frame and the new compression level to the one or more clients of the interactive streaming image system.

9. The system of claim 8, further comprising one or more multiplier lookup tables in communication with the content encoder, the one or more multiplier lookup tables each being associated with a level of compression.

10. The system of claim 8, wherein the target compression level is a higher level of compression than the initial compression level.

11. The system of claim 8, wherein the target compression level is a lower level of compression than the initial compression level.

12. The system of claim 8, wherein the number of frames to achieve the target compression level is greater than or equal to fifteen.

* * * * *